United States Patent
McGinty et al.

(10) Patent No.: US 7,880,623 B2
(45) Date of Patent: Feb. 1, 2011

(54) MULTIPLE-LINK WATER DETECTION UNIT AND SYSTEM

(75) Inventors: Joseph Ralph McGinty, Madison, AL (US); Derek Phelps Gardner, Huntsville, AL (US)

(73) Assignee: Invetex Corporation, Huntsville, AL (US)

( * ) Notice: Subject to any disclaimer, the term of this patent is extended or adjusted under 35 U.S.C. 154(b) by 116 days.

(21) Appl. No.: 11/671,634

(22) Filed: Feb. 6, 2007

(65) Prior Publication Data

US 2008/0053197 A1 Mar. 6, 2008

Related U.S. Application Data

(60) Provisional application No. 60/824,203, filed on Aug. 31, 2006.

(51) Int. Cl.
*G08B 21/00* (2006.01)
(52) U.S. Cl. ...................... 340/604; 340/605
(58) Field of Classification Search ................. 340/605, 340/870.16, 604
See application file for complete search history.

(56) References Cited

U.S. PATENT DOCUMENTS

| | | | | |
|---|---|---|---|---|
| 5,188,143 A | * | 2/1993 | Krebs | 137/312 |
| 6,175,310 B1 | * | 1/2001 | Gott | 340/605 |
| 2003/0222783 A1 | * | 12/2003 | Amacher | 340/604 |
| 2005/0174246 A1 | * | 8/2005 | Picco et al. | 340/604 |

* cited by examiner

*Primary Examiner*—Hezron Williams
*Assistant Examiner*—Nathaniel Kolb
(74) *Attorney, Agent, or Firm*—Gardner Groff Greenwald & Villanueva, P.C.

(57) ABSTRACT

A multiple-link leak detector apparatus to be used on a floor or other substantially flat surface and in conjunction with an appliance, plumbing fixture or other potential water leak source. The leak detector apparatus includes a multiple-link sensor having two or more bodies linked together, each link body having at least two spaced apart sensor elements, and an electronics module associated with the sensor elements. The multiple-link sensor is shaped and dimensioned to rest atop the floor and can be positioned beside or around an appliance, plumbing fixture or other potential water leak source. The sensor elements extend longitudinally along the link body, wherein the sensor elements are operative to sense the presence of water on the floor. Finally, the electronics module is coupled to the sensor elements to trigger an alert in response to the presence of water on the floor.

14 Claims, 9 Drawing Sheets

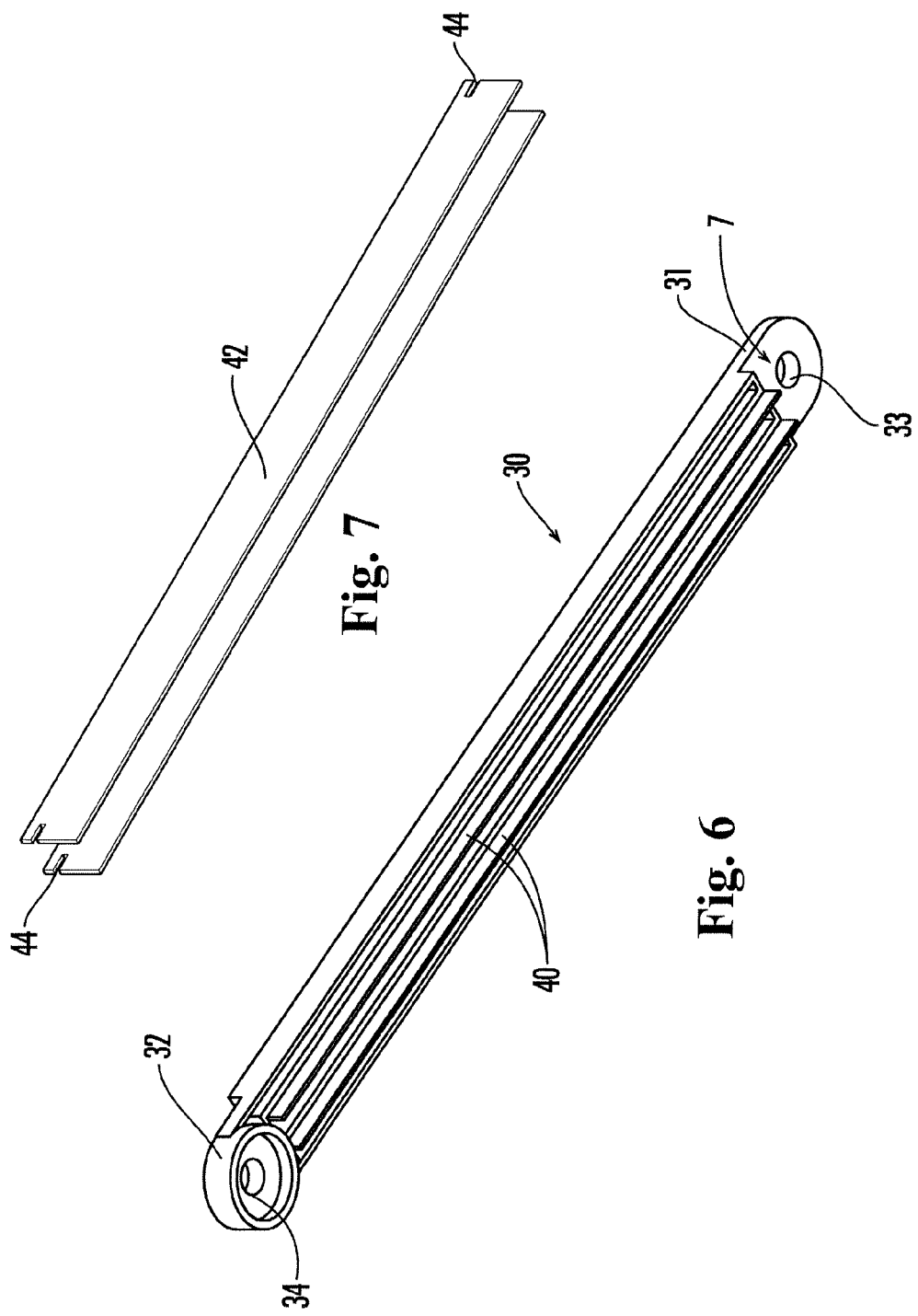

MULTIPLE-LINK WATER DETECTION UNIT AND SYSTEM

CROSS-REFERENCE TO RELATED APPLICATIONS

The benefit of the filing date of U.S. provisional patent application Ser. No. 60/824,203, filed Aug. 31, 2006, entitled MULTIPLE-LINK WATER DETECTION UNIT AND SYSTEM, is hereby claimed, and the specification thereof is incorporated herein by this reference.

TECHNICAL FIELD

The present invention relates generally to a water sensing system and in particular relates to a water detection system for sensing water leaks around plumbing fixtures, various appliances, and under raised computer floors in computer server rooms.

BACKGROUND OF THE INVENTION

Every year, considerable damage is done to homes and business establishments by leaking water from roof leaks, plumbing fixtures, pipes, water heaters, air conditioners, and other appliances. These leaks often occur for a long period of time before any evidence or damage is noticed, often with catastrophic results, such as floors falling in or excessive mildew and/or mold growth. This damage often results in insurance claims and settlements that cost businesses, consumers and insurance companies untold millions of dollars per year. Although there are some leak detection systems in the market, most are expensive, complicated, and/or difficult for the user to install in conjunction with existing appliances or other plumbing fixtures.

A water leak often develops at night, on weekends, or at other times when the leak is not easily detected. Additionally, water leaks often occur in locations that are not readily accessible by a worker or homeowner, or in locations that are not often visited such as second homes. Therefore, water leaks are often not detected until the leak has become a substantial problem, which may result it flooding, floors or walls caving in, severe wood rot, etc. These problems and others can be incredibly expensive and time consuming to repair.

Moreover, in many situations is would be desirable to provide a leak detector device for use with an existing, already installed appliance or plumbing fixture. Such an existing appliance or plumbing fixture can be difficult to move or lift, making it problematic to install a leak detector under or around the appliance or plumbing fixture. For example, if one wanted to place a leak detector device under a hot water heater, the difficulty of lifting the hot water heater can prevent one from placing the leak detector device under the hot water heater.

Accordingly, it can be seen that a need yet remains in the art for a leak detection apparatus and leak detector system that is easily installed for use with existing appliances and plumbing fixtures, alerts a user to the presence of a water leak, and is reliable in operation. It is to the provision of such a leak detection apparatus and leak detection system that the present invention is primarily directed.

SUMMARY OF THE INVENTION

Briefly described, in a first preferred form the present invention comprises a leak detector apparatus for use on a floor or other flat surface and in conjunction with an appliance, plumbing fixture or other potential water leak source. The leak detector apparatus includes a multiple-link sensor having two or more bodies linked together, each link body having at least two spaced-apart sensor elements, and an electronics module associated with the sensor elements. The multiple-link sensor is shaped and dimensioned to rest atop the floor and can be positioned beside or around an appliance, plumbing fixture or other potential water leak source. The sensor elements extend longitudinally along the link body, wherein the sensor elements are operative to sense the presence of water on the floor. Finally, the electronics module is coupled to the sensor elements to trigger an alert in response to the presence of water on the floor.

Optionally, the leak detector apparatus has at least two spaced apart sensor elements that comprise sensor blades, wherein the sensor blades stand on edge and generally extend between the end portions of the link bodies.

Preferably, the leak detector apparatus further includes electrical couplers to electrically couple the sensor elements in one link body with the sensor elements in an adjacent link body.

Presently available sensing wire has stripped segments and comes on a roll. The mechanical memory from the roll causes the wire segments to coil after installation, which can raise the wire from the installed area and reduce the wire's sensing abilities. The advantage of the present invention over currently available sensing wires, is that the multiple-link sensors have no mechanical memory and will stay in contact with the floor after installation.

In another preferred form the present invention comprises a modular leak detector apparatus for use on a floor or other flat surface and in conjunction with an appliance, plumbing fixture or other potential water leak source. The modular leak detector apparatus includes a plurality of sensor links adapted to be mechanically linked together in a daisy-chain fashion, each sensor link having a pair of spaced-apart sensor blades, and an electronics module. The sensor links can be shaped and dimensioned to rest atop the floor and be positioned beside or around an appliance, plumbing fixture or other potential water leak source. The sensor blades can be positioned adjacent the floor to sense the presence of water on the floor. Finally, the electronics module can be electrically coupled to the sensor links for triggering an alert in response to the presence of water on the floor.

In still another form the present invention comprises a leak detector system for use on a floor and in conjunction with two or more appliances, plumbing fixtures or other potential water leak sources. The system includes a plurality of leak detector apparatuses adapted to be placed on the floor positioned under, beside, or around an appliance, plumbing fixture or other potential water leak source, with each leak detector apparatus including one or more sensors for detecting the presence of liquid. A plurality of local processors is electrically coupled to the plurality of sensors, with the local processors being provided at least one per leak detector apparatus. A master controller is in communication with the local processors for monitoring the function and operation of each local processor.

With this construction, advantageously the leak detector can be installed and used quite easily with existing appliances and plumbing fixtures. This is so because there is no need to lift or remove the existing appliance or plumbing fixture to install the leak detector. Conveniently, the present invention allows the leak detector to be placed along a peripheral portion of the appliance or fixture. Indeed, the present invention even allows the leak detector to completely encircle the appliance or plumbing fixture without moving the appliance or plumbing fixture. This is so because the present invention allows the user or installer to install the leak detector along or around the item piece by piece due to the modular aspect of the invention.

BRIEF DESCRIPTION OF THE DRAWINGS

FIG. 6 is a bottom perspective view of an individual link body portion of the apparatus shown in FIG. 1.

FIG. 7 is a perspective view of a sensor element according to an example embodiment of the present invention.

DETAILED DESCRIPTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
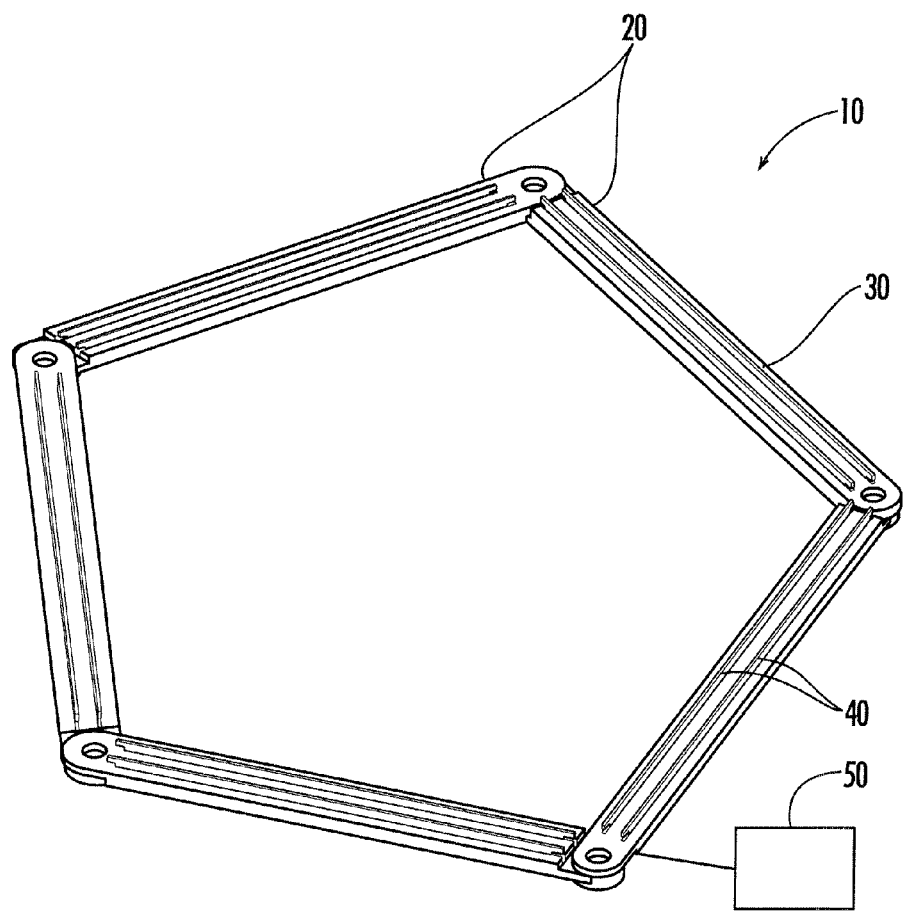
FIG. 1 is a top perspective view of a leak detector apparatus according to an example embodiment of the present invention.
Figure 2:
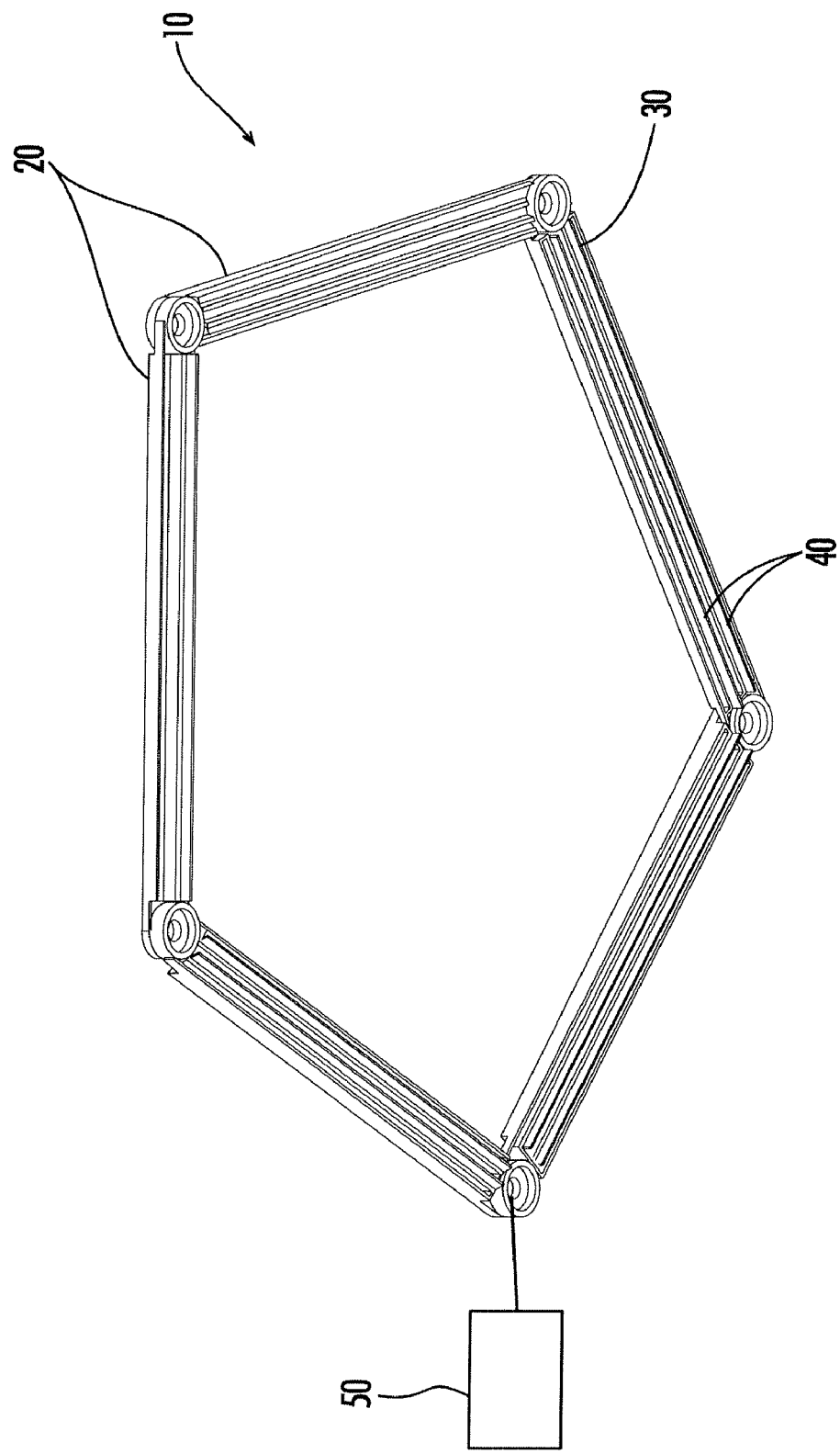
FIG. 2 is a bottom perspective view of the leak detector apparatus of FIG. 1.

With reference now to the drawing figures, in which like numerals represent like elements or steps throughout the several views, FIGS. 1-9 depict a link detector apparatus 10 for use in conjunction with an appliance, plumbing fixture or other potential water leak source. Generally, the leak detector apparatus 10 includes a multiple-link sensor 20 having two or more rigid link bodies 30, each link body having at least two spaced apart sensor elements 40, and an electronics module 50 associated with the sensor elements as seen in FIGS. 1-2. It is intended that the apparatus be used on the floor or other substantially flat surface and be positioned adjacent or around an appliance, plumbing fixture, or any other potential water leak source that a user wishes to monitor.

Figure 3:
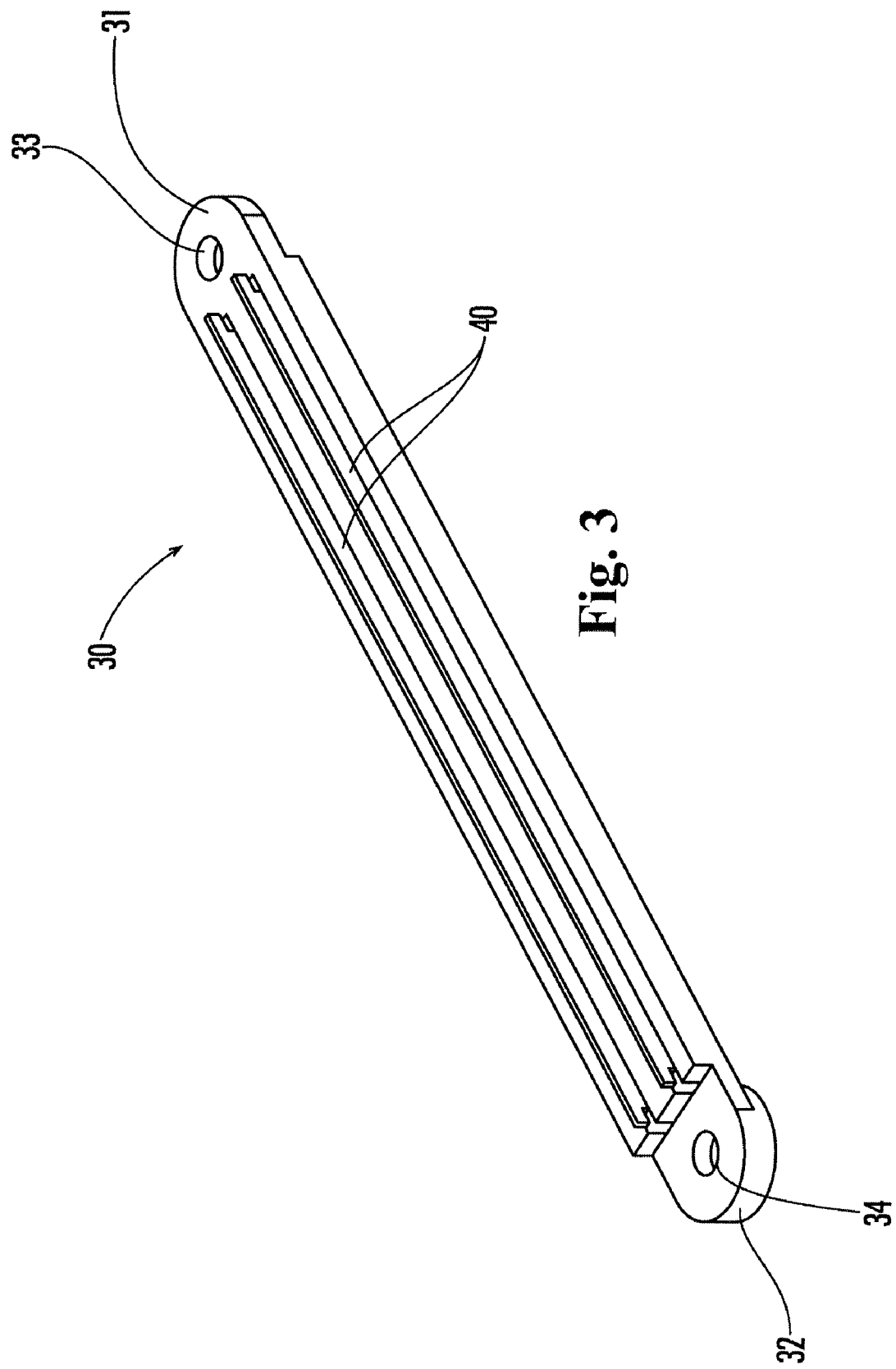
FIG. 3 is a top perspective view of an individual link body portion of the apparatus shown in FIG. 1.
Figure 4:
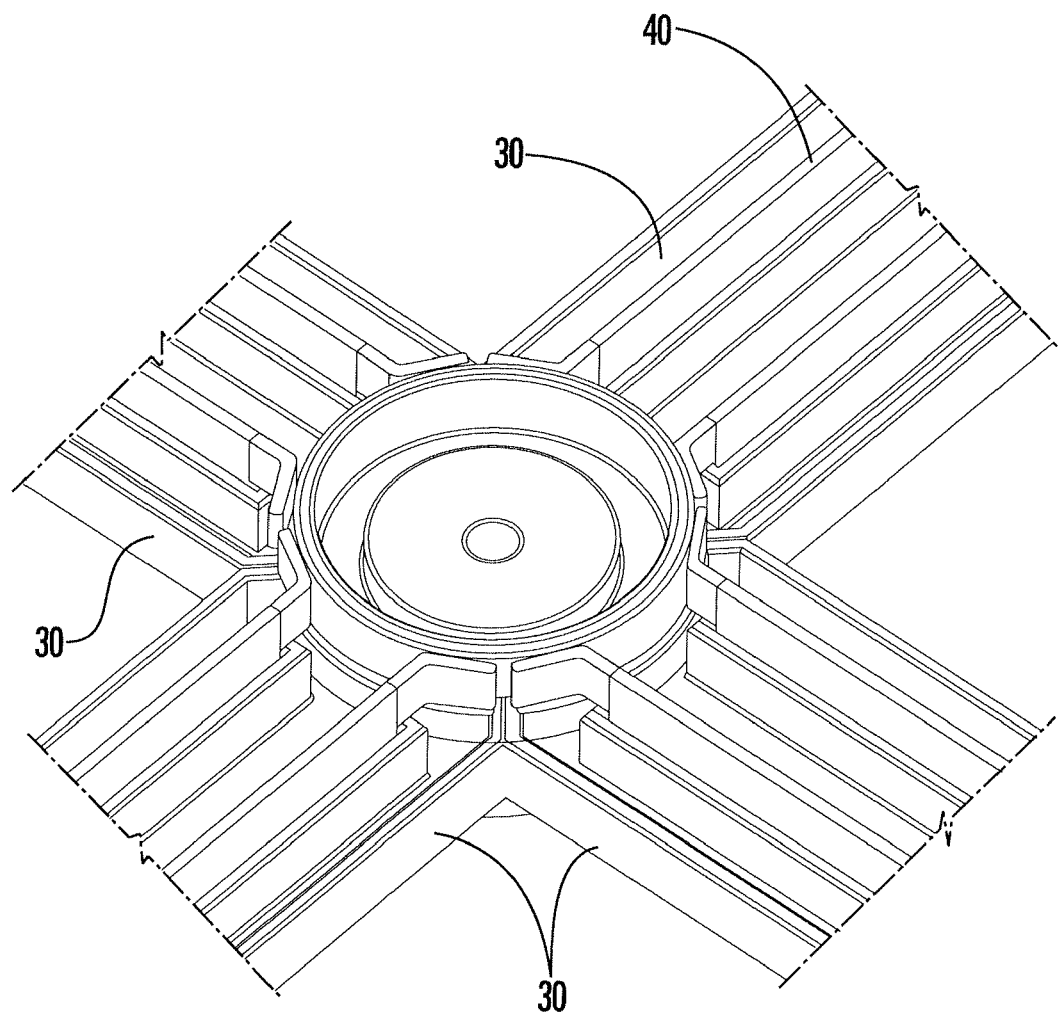
FIG. 4 is a bottom perspective view of four link bodies connected together at one intersection.
Figure 5:
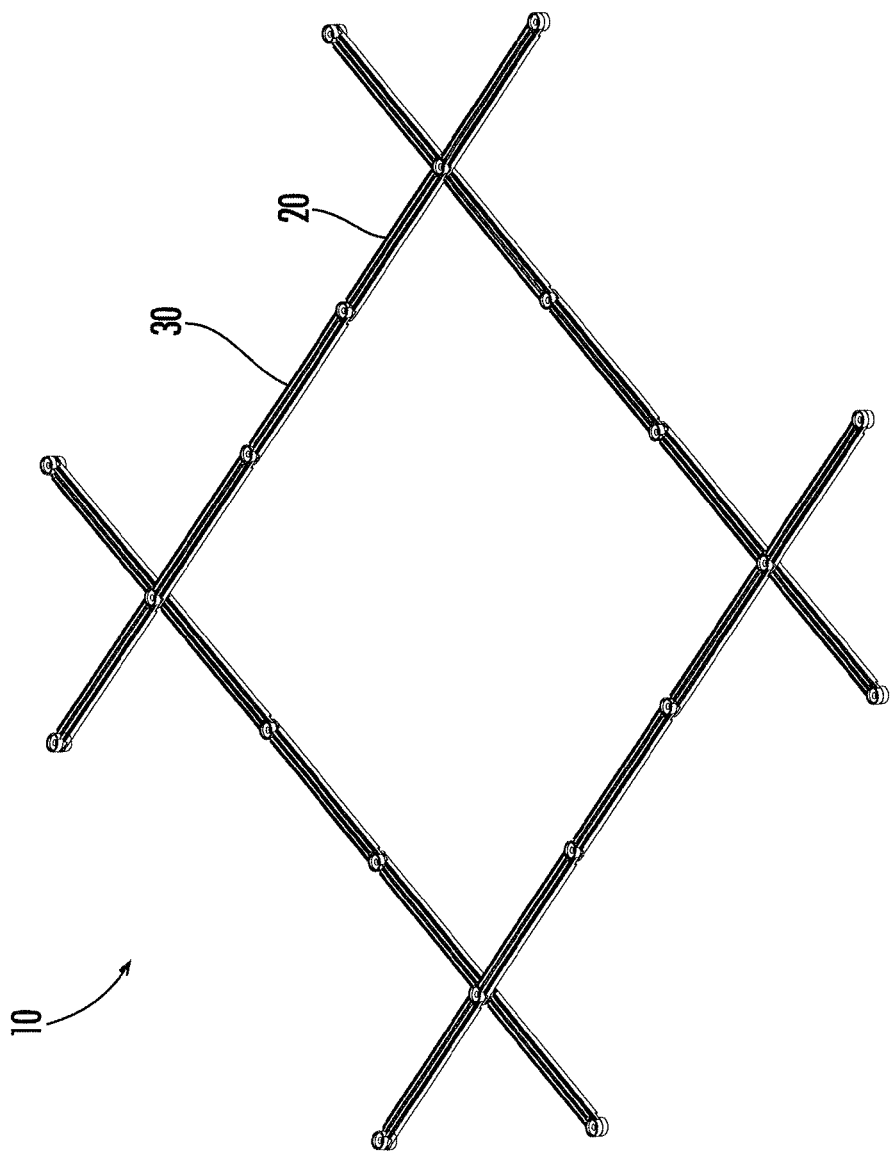
FIG. 5 is a top perspective view of the leak detector apparatus shown in FIG. 1 in an alternative configuration.

The multiple-link sensor 20 is formed from connecting two or more link bodies 30 in series. Each link body 30 is an elongated strip of plastic, rubber, or other non-conducting, non-absorbing material as seen in FIGS. 3-4. The link bodies 30 can be linked together via connectors 31,32 at the distal ends of each body. Each link body 30 can have a male connector 31 and a female connector 32 for pivotally mounting two or more link bodies together. Multiple link bodies can be seen mounted together in alternative configurations in FIGS. 4-5. As an alternative to pivotally connecting the link bodies to one another, the link bodies can be attached together with elements that allow the link bodies to assume a plurality of discrete angular positions relative to each other. However, the pivotal connection is preferred in that it provides the greatest flexibility. In other embodiments as seen in FIGS. 3-4, connectors 31,32 can have mounting holes 33,34 for receiving a connecting pin (not shown) therein for attaching two or more bodies in series (the connecting pin can act as a pivot pin). In this way, the link bodies are pivotally connected to one another. Optionally, connectors 31 and 32 of two connecting bodies 30 can snap together to rigidly secure each to the other. While circular connectors 31,32 are shown in the drawing figures, it is conceivable that other shaped connectors can be used with the present invention. It is to be understood that the present invention is intended to encompass connectors having rectangular, starred, polygonal, etc. shaped fittings. Additionally, it is understood that there are numerous ways of connecting the link bodies 30 of the present invention, and as such, this disclosure in no way is intended to be limited to only those methods described herein.

Each link body 30 also includes at least two, and preferably a pair of, spaced-apart sensor elements 40 to sense the presence of water on the floor or other substantially flat surface on which the leak detector apparatus 10 is placed. The sensor elements 40 also sense water that from the top, should water fall on top of the elements. To accommodate the sensor elements 40, the link body 30 includes slots for receiving the sensor elements therethrough and for holding the sensor elements upright. In this regard, the sensor elements 40 can comprise conducting sensor blades 42, as seen in FIG. 7, wherein the sensor blades generally stand on edge and substantially extend longitudinally along the link bodies 30. In example embodiments, the sensor blades 42 can have blade retainers 44 for securing the blades in the link bodies 30. In other embodiments, the sensor elements 40 may only be positioned near the bottom of the link body 30. In still further embodiments, the sensor elements 40 can comprise wires, or other conducting means.

Figure 8:
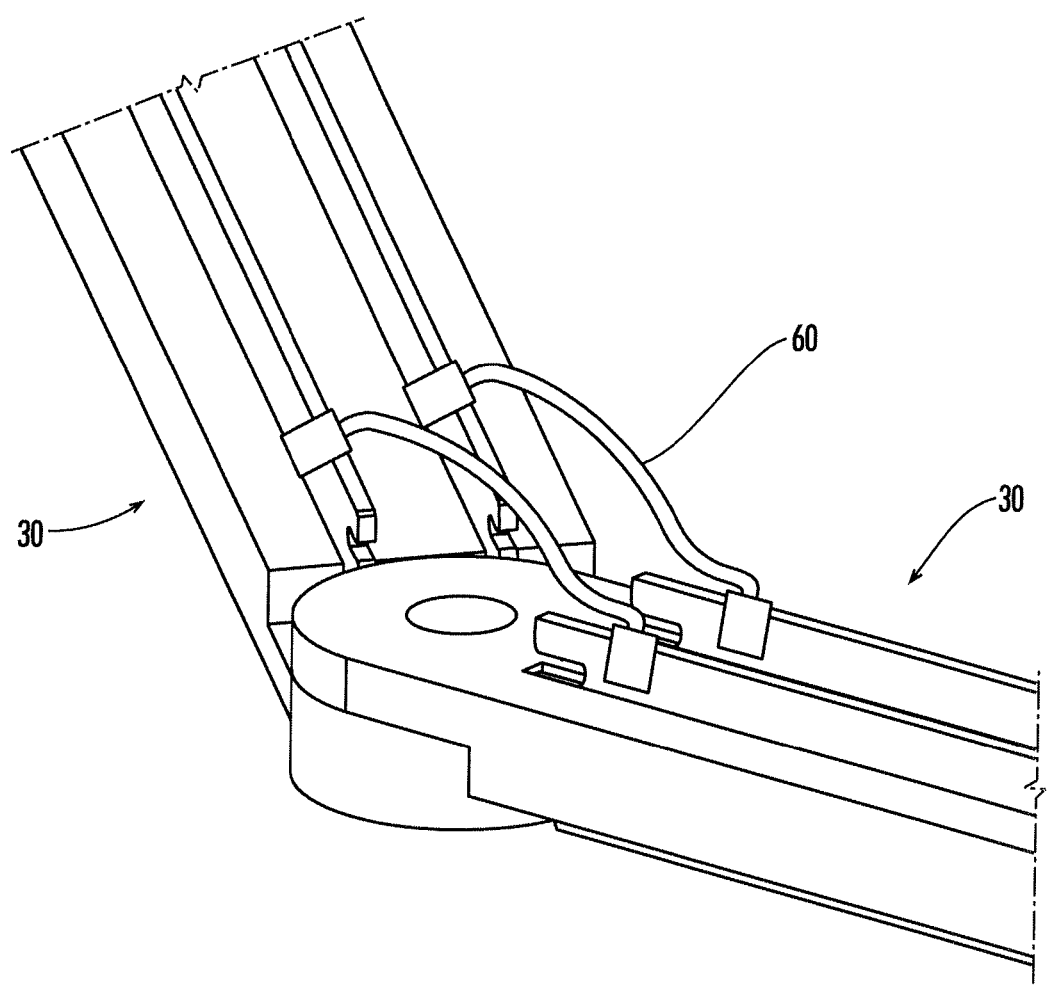
FIG. 8 is a perspective view of an electronic coupler for connecting two link bodies shown in FIG. 3 according to an example embodiment of the present invention.

When connecting multiple link bodies together, electrical couplers 60 can be used to connect the sensor elements 40 from one link body to an adjacent link body, as seen in FIG. 8. It is conceivable that numerous types of couplers 60 can be used to connect adjacent sensors 40 including, but not limited to, wires and/or conducting clips. It should be noted that differing lengths of link bodies 30 can be manufactured to accommodate various user needs. For example, the link bodies 30 can be manufactured in lengths of 8 inches, 12 inches, or 16 inches, or any other convenient length as needed.

It is preferable, but not required, that each sensor element 40 is non-insulated and coated with conduction materials that resist corrosion and oxidation for the life of the apparatus 10. Water (not shown) that bridges the sensor elements 40 creates an electrical contact, wherein the electrical resistance between the spaced-apart sensor elements is lowered significantly. By lowering the electrical resistance between the two sensor elements 40 an electronics module 50 associated with the sensors can detect the presence of water within the apparatus 10. The sensitivity of the apparatus 10 can be regulated by controlling the depth that the sensor elements 40 extend through the link bodies 30 and by controlling the width between each sensor. For example, by extending the sensors 40 to the bottom of the link bodies 30 such that the sensor elements rest on the floor, less water depth is needed before the gap between the sensors is bridged. Conversely, designing the link bodies to hold the sensor elements 40 near the top of the link body 30 requires a greater amount of water to bridge the sensors.

The electronics module 50 can be remotely located (as seen in FIG. 1) or it can be affixed on top of one or more link bodies 30. In such embodiments wherein the module 50 is mounted remotely from the multiple-link sensor 20, the module may be secured to an adjacent appliance, fixture, or rest freely on a surrounding surface. The module 50 can contain a microprocessor that interfaces with the sensor elements 40. If the microprocessor determines that water is present, it can alert a user that water was found in numerous ways including: a local indicator light, an audible sound, notify a master controller, etc. In further embodiments, the module 50 can be electronically coupled with a master controller, whereby the master controller monitors the leak status of several leak detector apparatuses. The module 50 can be associated with a master controller through the use of hard wiring, radio frequency (RF), infrared technology (IR), or other non-contact manners. Power can be provided to the module 50 via a battery, or the module can be plugged into a home/office electrical system if available.

In operation, a user can encircle a portion or the entirety of an appliance or other potential water leak source with a leak detector apparatus 10 by placing individual link bodies on the floor and linking (connecting) them together mechanically and electrically. Conveniently, this allows a user to emplace a leak detector adjacent or all the way around a heavy, generally immovable appliance or plumbing fixture. If water leaks from such a source and comes into contact with the sensor elements 40 of the apparatus 10, the module 50 detects a change in the electrical resistance between the sensors and alerts a user via one of the above-mentioned methods.

There are numerous applications of the leak detector apparatus of the present invention, and the present invention is particularly useful in monitoring the leak status of pre-existing appliances or other problematic sources in which it would be difficult, or impossible, to retrofit such sources with other methods of remote monitoring.

Figure 9:
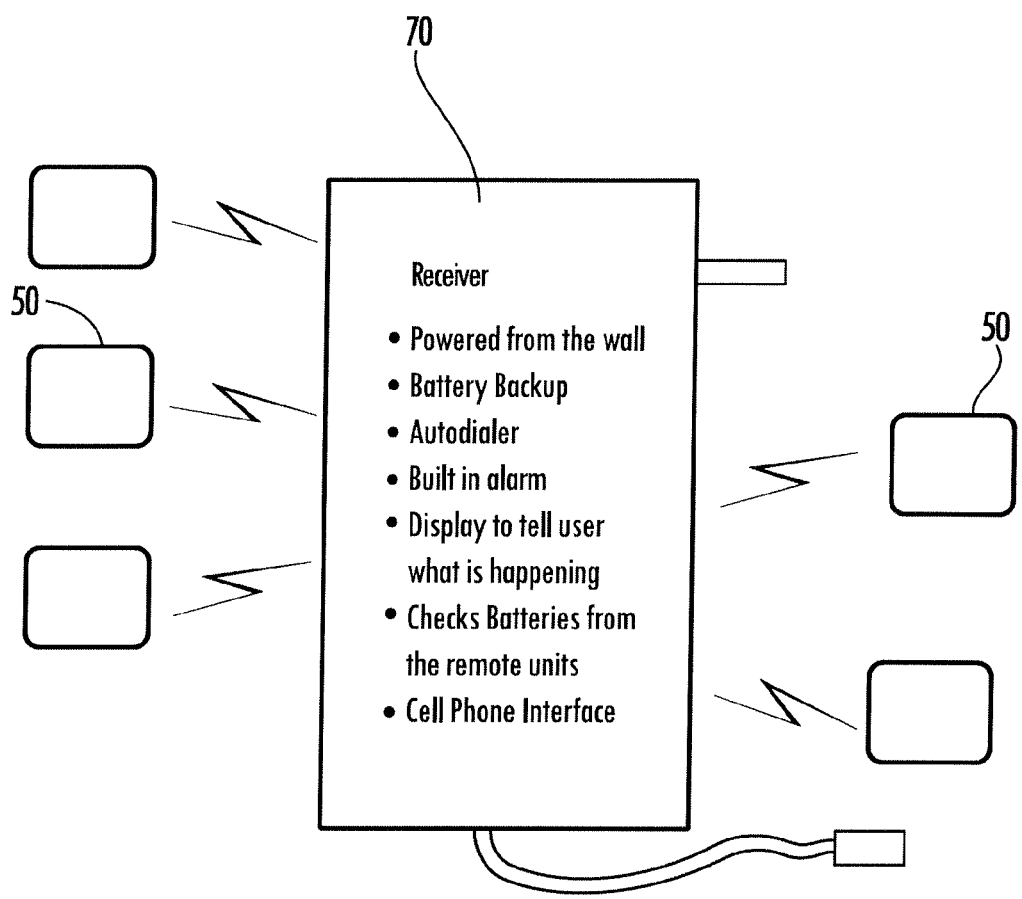
FIG. 9 is a functional diagram of a leak detection system according to an example embodiment of the present invention.
Figure 10:
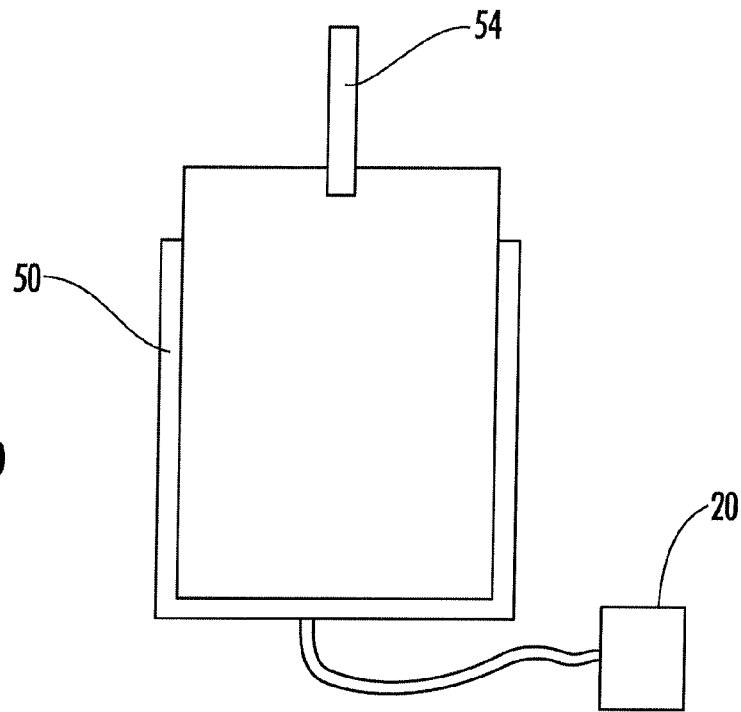
FIG. 10 is a side view of the electronics module shown in FIG. 9.
Figure 11:
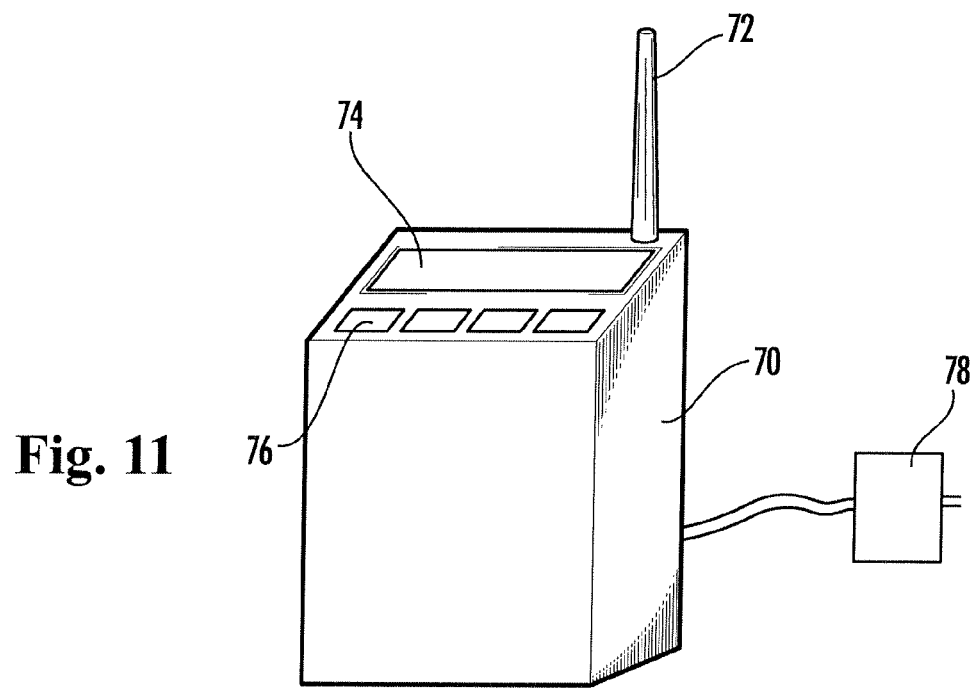
FIG. 11 is a perspective view of the master controller shown in FIG. 9.

It is conceivable that a single home or office may utilize multiple leak detector apparatuses of the present invention to detect for possible water leaks around several appliances, plumbing fixtures etc. Therefore, each apparatus may be coupled to a master controller 70 to form a leak detection system. Such a system can permit a user to review one device for the status of all such apparatuses as seen in FIG. 9. Additionally, the master controller 70 can be wired into the residence/office phone line and equipped with an auto-dialer for alerting a user by phone of a possible leak. As noted earlier, each electronics module (50) can be associated with a master controller 70 through the use of hard wiring, radio frequency (RF), infrared technology (IR), or other non-contact manners. For instance, each module (50) can also serve as a RF box having an internal or external antenna 54 to communicate with the master controller 70 as depicted in FIG. 10. As seen in FIG. 11, the master controller 70 can include an internal or external antenna 72, one or more display screens 74, control buttons 76, and an outlet plug 78. The master controller can alert a user to a variety of information such as, but not limited to, the leak status of all of the leak detector apparatuses, battery condition of the remote units, and leak history of all of the linked up units.

While the invention has been described with reference to preferred and example embodiments, it will be understood by those skilled in the art that a variety of modifications, additions and deletions are within the scope of the invention, as defined by the following claims.

What is claimed is:

1. A leak detector apparatus for use on a floor or other flat surface and in conjunction with an appliance, plumbing fixture or other potential water leak source, the leak detector apparatus comprising:
   a multiple-link sensor shaped and dimensioned to rest atop the floor and to be positioned beside or around the appliance, plumbing fixture or other potential water leak source, the multiple-link sensor comprising two or more link bodies linked together;
   each link body includes at least two spaced apart elongate sensor elements extending longitudinally along the link body, the sensor elements comprising sensor blades, with the sensor blades standing substantially on edge and extending substantially between end portions of the link bodies to form a substantially continuous sensor assembly along the individual link bodies, said sensor blades also extending completely through the link body in a vertical direction such that the sensor blades are exposed above and below the link body, and wherein the sensor elements are operative to sense the presence of water on the floor or water falling on the link body from above, and with the link bodies linked together the individual substantially continuous sensor assemblies of the individual link bodies are linked to one another; and
   an electronics module associated with the sensor elements and electrically coupled thereto for triggering an alert in response to the presence of water on the floor.

2. A leak detector apparatus as claimed in claim 1 wherein the link bodies have slots formed therein for receiving the sensor blades therethrough and for holding the sensor blades upright.

3. A leak detector apparatus as claimed in claim 1 further comprising electrical couplers electrically coupling the sensor elements in one link body with the sensor elements in an adjacent link body.

4. A leak detector apparatus as claimed in claim 3 wherein the electrical couplers comprise jumper wires.

5. A leak detector apparatus as claimed in claim 1 wherein the link bodies snap together at their ends.

6. A leak detector apparatus as claimed in claim 5 wherein the link bodies are rigid.

7. A leak detector apparatus as claimed in claim 1 wherein the link bodies are pivotally mounted to one another at their ends to allow the multi-link sensor to be formed into a variety of configurations.

8. A leak detector apparatus as claimed in claim 1 wherein the electronics module is electrically coupled to a master controller.

9. A leak detector apparatus as claimed in claim 1 wherein the electronics module is coupled to a master controller via RF, IR or some other non-contact manner.

10. A modular leak detector apparatus for use on a floor or other flat surface and in conjunction with an appliance, plumbing fixture or other potential water leak source, the modular leak detector apparatus comprising:
   a plurality of individual sensor links shaped and dimensioned to rest atop the floor and to be positioned beside or around the appliance, plumbing fixture or other potential water leak source, the individual sensor links being adapted to be mechanically linked together in a daisy-chain fashion;

each sensor link including a pair of spaced apart sensor blades extending longitudinally along the link body, the sensor blades positioned substantially on edge and extending substantially from one end portion of the sensor links to another end portion of the sensor links, said sensor blades also extending completely through the link body in a vertical direction such that the sensor blades are exposed above and below the link body, and the lower edges of the sensor blades being positioned adjacent the floor and wherein the sensor blades in each individual sensor link form a substantially continuous sensor assembly such that the plurality of substantially continuous sensor assemblies are operative to sense the presence of water on the floor or water falling on the link body from above; and an electronics module associated with the sensor links and electrically coupled thereto for triggering an alert in response to the presence of water on the floor.

11. A modular leak detector apparatus as claimed in claim 10 wherein the sensor links have slots formed therein for receiving the sensor blades therethrough and for holding the sensor blades generally upright.

12. A modular leak detector apparatus as claimed in claim 10 further comprising electrical couplers electrically coupling the sensor blades in one sensor link with the sensor blades in an adjacent sensor link.

13. A modular leak detector apparatus as claimed in claim 10 wherein the sensor links snap together to each other at their ends.

14. A modular leak detector apparatus as claimed in claim 10 wherein the sensor links are pivotally mounted to one another at their ends to allow the modular leak detector to be formed into a variety of shapes.

* * * * *